United States Patent Office 3,580,936
Patented May 25, 1971

3,580,936
5β-TAUROCHOLENIC ACIDS AND
5β-TAUROCHOLADIENIC ACIDS
Arthur A. Patchett, Cranford, and John Hannah, Matawan, N.J., assignors to Merck & Co., Inc., Rahway, N.J.
No Drawing. Continuation-in-part of application Ser. No. 677,080, Oct. 23, 1967. This application Oct. 2, 1968, Ser. No. 764,650
Int. Cl. C07c *169/54*
U.S. Cl. 260—397
42 Claims

ABSTRACT OF THE DISCLOSURE

5β-taurocholenic acids wherein the double bond may be either in the 22-position of the aliphatic chain or within the cholane ring; and 5β-taurocholadienic acids wherein one double bond is in the 22-position of the chain and the second is within the cholane nucleus; and the salts, esters and amide derivatives thereof. The instant products may be obtained: (1) via the reaction of a 5β-cholenic acid or 5β-choladienic acid with an alkyl haloformate in the presence of a base to afford a 5β-cholenic alkylcarbonic anhydride or 5β-choladienic alkylcarbonic anhydride, which intermediate is then treated with taurine in a basic medium to yield the desired 5β-taurocholenic acid salt or 5β-taurocholadienic acid salt; or (2) by the reaction of the acid halide of cholenic acid with either taurine or with a suitable taurine salt in the presence of a base. The products are hypocholesterolemics and hypolipemics which have utility in the treatment of conditions associated with blood lipid deposition.

---

This is a continuation-in-part of application Ser. No. 677,080, filed Oct. 23, 1967.

This invention relates to a new class of chemical compounds which can be described generally as 5β-taurocholenic acids and 5β-taurocholadienic acids and to the nontoxic, pharmacologically acceptable salts, esters and amide derivatives thereof.

Also, it is an object of this invention to describe a novel method of preparation for the instant products, their salts, esters and amides.

Studies show that cholesterol and triglyceride play a major role in the formation of atherosclerotic plaques by accelerating the deposition of blood lipids on the arterial wall. It is the purpose of this invention to disclose a new class of chemical compounds which effectively reduce the concentration of cholesterol, triglyceride and other lipids in blood serum and, therefore ameliorate conditions associated with blood lipid deposition.

The 5β-taurocholenic acids and 5β-taurocholadienic acids of this invention are compounds having the following general formula:

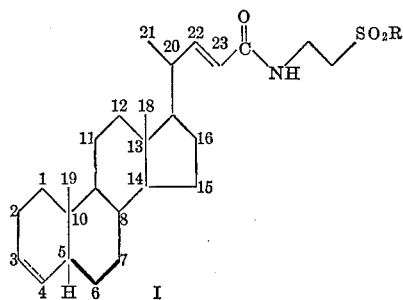

wherein R is hydroxy, alkoxy, for example, lower alkoxy such as methoxy, ethoxy, etc., —OM wherein M is a cation derived from a metal of the first group of the Periodic System as, for example, the cation derived from an alkali metal hydroxide, carbonate, nitrate, etc. such as sodium hydroxide, potassium hydroxide, potassium carbonate, silver nitrate, etc., or an amino radical of the formula: —NR$^1$R$^2$ wherein R$^1$ and R$^2$ are similar or dissimilar members selected from hydrogen or lower alkyl such as methyl, ethyl, etc., and when R is hydroxy, the nontoxic, pharmacologically acceptable acid addition salts of the resulting acid as, for example, the salts obtained by treating the said acid with a primary, secondary or tertiary amine, for example, methylamine, dimethylamine, triethylamine, etc. or with hydrazine, N,N-dimethylhydrazine, etc.

The dotted line which appears in the 3-position of the foregoing Formula I is meant to indicate that the instant products may or may not contain an unsaturated double bond within the cholane ring and indicates further that the point of nuclear unsaturation is not limited to the 3-position in the ring but is intended to include all other isomeric derivatives thereof as, for example, the Δ$^7$, Δ$^{11}$, etc. isomeric derivatives.

The several varieties of products which are embraced by this invention can be further illustrated by the following planar formulae. Thus, for example, the 5β-taurocholenic acids (Ia, infra) are products having the following general formula:

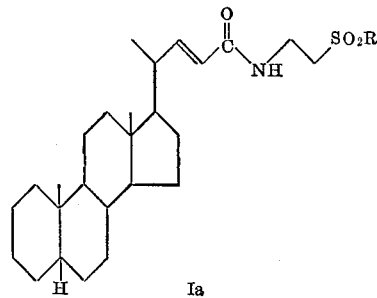

wherein R is as defined above; and the 5β-taurocholadienic acids (Ib, infra) are products having the following general formula:

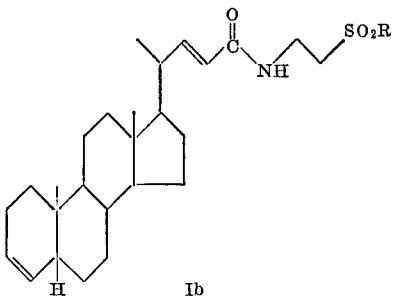

wherein R is as defined above and wherein it is understood that the Δ$^3$ double bond can be in any one of several positions in the cholane nucleus as, for example, in the Δ$^7$ and Δ$^{11}$ positions, etc.

Also, included within this invention are those isomeric derivatives of 5β-taurocholenic acid (Ia, supra) wherein the double bond is located solely within the carbocyclic nucleus. Typical of these derivatives are the Δ$^3$, Δ$^6$, Δ$^7$, Δ$^{9(11)}$ and Δ$^{11}$ isomers illustrated by the planar Formula Ic which appears below. Although the following Formula (Ic) illustrates a Δ$^3$-5β-taurocholenic acid product it is to be understood that the point of nuclear unsaturation is not limited to the 3-position but includes as well the $\Delta^6$, $\Delta^7$, $\Delta^{9(11)}$ and $\Delta^{11}$ isomeric derivatives thereof:

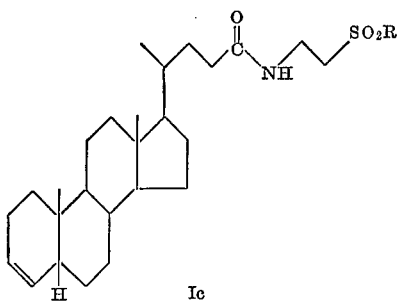

wherein R is as defined above. The foregoing products (Ic) also effect a significant reduction in the concentration of cholesterol in blood serum and, therefore, like their $\Delta^{22}$ isomers, are similarly useful in the treatment of conditions associated with blood lipid deposition.

Although all of the instant products (I) effectively reduce the concentration of cholesterol and triglyceride in blood serum it has been found that the alkali metal salts of $\Delta^{22}$-5β-taurocholenic acid (Id, infra) are especially suitable for this purpose. This subclass of compounds combines a high order of activity with little or no adverse side effects and, therefore, represents a preferred subgroup within the scope of this invention. The following structural formula illustrates this preferred embodiment:

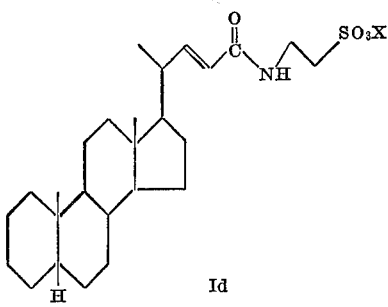

wherein X is a cation derived from a metal of the first group of the Periodic System as, for example, sodium, potassium, etc.

The presence of the $\Delta^{22}$ ethylenic double bond in the instant products (I) gives rise to geometrical isomerism, i.e., the possibility of a cis-trans arrangement of functional groups. The desired spatial arrangement is most advantageously achieved by employing as a reactant in the preparative method to be discussed infra either the cis or the trans starting material corresponding to the desired isomeric product; however, it will be appreciated by those skilled in the art that other methods may also be employed as, for example, by a separation of a cis and trans mixture of the product (I) by conventional separation techniques. Both the cis and trans varieties of the instant compounds (I) are useful in the treatment of hypercholesterolemia and it is to be understood that both isomeric derivatives as well as the stereoisomeric mixtures of those isomers are within the scope of this invention.

The 5β-taurocholenic acids and 5β-taurocholadienic acids of this invention are conveniently obtained by treating an appropriate 5β-cholenic acid (II, infra) or 5β-choladienic acid with an alkyl haloformate in the presence of a base, followed by the reaction of the mixed anhydride (e.g., III, infra) thus obtained with taurine in a basic medium as, for example, in an aqueous solution of an alkali metal hydroxide, etc. or in the presence of a trialkylamine, etc.; the 5β-taurocholenic acid salt (Ie, infra) or 5β-taurocholadienic acid salt thus formed may then be isolated and purified as the product of the invention or, if desired, the said salt may be converted to its corresponding sulfonic acid (e.g., If, infra) by the application of conventional techniques as, for example, by running a solution of the salt (If) in aqueous dimethylformamide or in aqueous methanol through a sulfonated ion-exchange column followed by evaporation of the solvent in vacuo from the resulting eluate. The following equation illustrates the foregoing method of preparation, however, it is to be understood that the $\Delta^{22}$-5β-cholenic acid depicted below as the starting material (II) in the process is only illustrative of the several types of isomeric derivatives which may be similarly employed; when, for example, a $\Delta^3$, $\Delta^6$, $\Delta^7$, $\Delta^{9(11)}$ or $\Delta^{11}$ isomer of $\Delta^{22}$-5β-cholenic acid (II) is employed as a starting material in the process and the reaction is conducted in an otherwise analogous manner the corresponding $\Delta^3$, $\Delta^6$, $\Delta^7$, $\Delta^{9(11)}$ and $\Delta^{11}$-5β-taurocholenic acid product is obtained and when the appropriate $\Delta^{3,22}$, $\Delta^{7,22}$ or $\Delta^{11,22}$-5β-choladienic acid, etc. is substituted for the said $\Delta^{22}$-5β-cholenic acid reactant (II) the corresponding $\Delta^{3,22}$, $\Delta^{7,22}$ and $\Delta^{11,22}$-5β-taurocholadienic acid product, etc. is obtained:

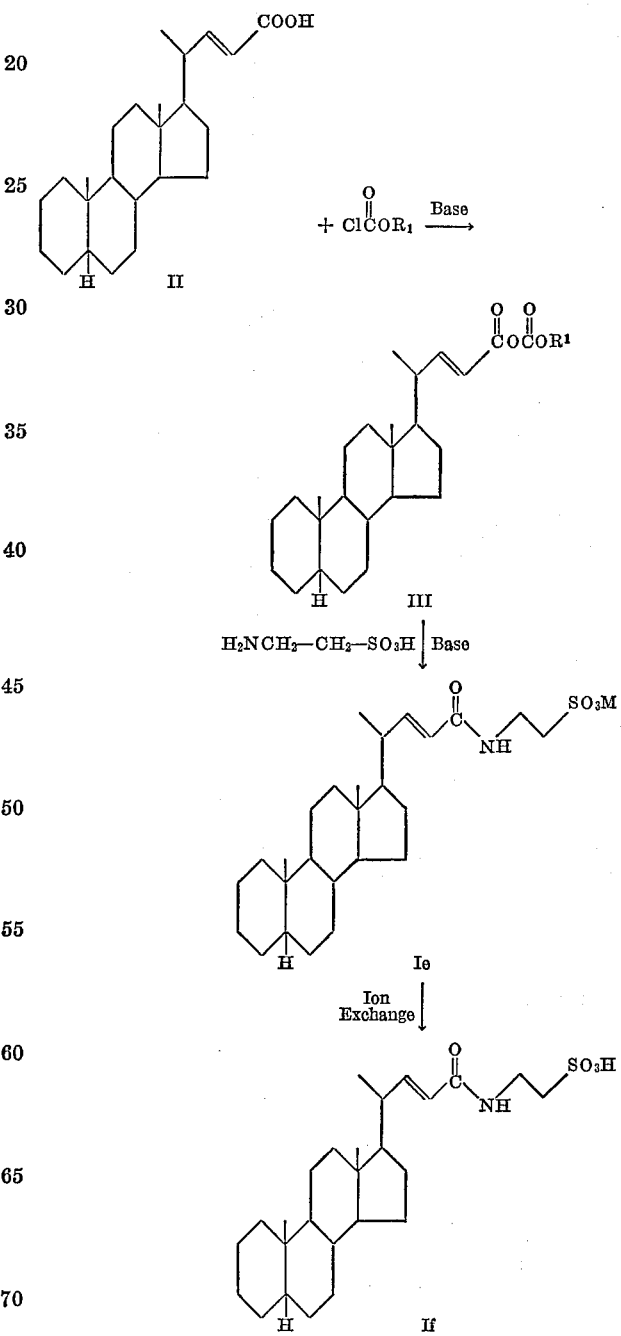

wherein $R^1$ is lower alkyl, for example, methyl, ethyl, isobutyl, etc. and M is as defined above.

Also, in lieu of taurine in the foregoing equation, a taurine amide may be substituted therefor and the process conducted in an otherwise similar manner to yield the corresponding 5β-cholenic acid taurine amide (IV, infra) or 5β-choladienic acid taurine amide. However, when taurine amide is substituted for the taurine starting material it should, of course, be understood that the ion-exchange step of the preceding equation is no longer required because the taurine amide reacts directly with the mixed anhydride intermediate (III), to yield the desired 5β-cholenic acid taurine amide (IV). The following equation illustrates this method of preparation:

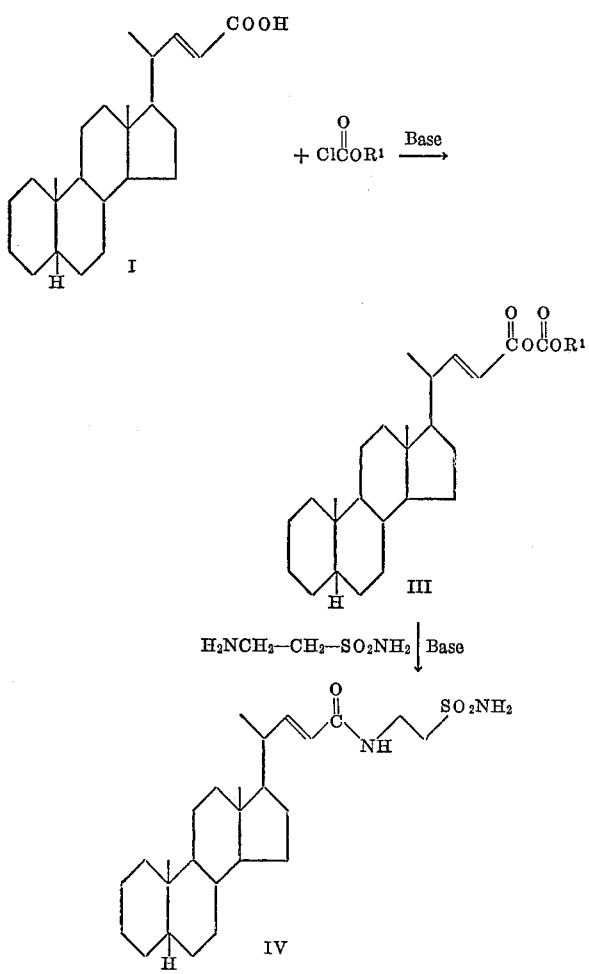

wherein $R^1$ is as defined above. The preceding equation is directed to the synthesis of the taurine amide of $\Delta^{22}$-5β-cholenic acid but it will be appreciated by those skilled in the art that the $\Delta^3$, $\Delta^6$, $\Delta^7$, $\Delta^{9(11)}$ and $\Delta^{11}$ isomeric derivatives thereof and, also, the taurine amide of $\Delta^{3,22}$, $\Delta^{7,22}$ and $\Delta^{11,22}$-5β-choladienic acid, etc. may be obtained simply by substituting the appropriate 5β-cholenic acid or 5β-choladienic acid starting material for the trans-$\Delta^{22}$-5β-cholenic acid (II) depicted therein and conducting the reaction in an otherwise analogous manner.

Still another method for the preparation of the instant products consists in treating the acid halide of cholenic acid or choladienic acid with either taurine or with a suitable taurine salt in the presence of a base. It is only necessary to add the cholenoyl halide or choladienoyl halide to a basic solution of the taurine or taurine salt reactant in order to effect the synthesis; however, in practice it is usually advantageous to conduct the process in a suitable solvent such as tetrahydrofuran or acetone with the application of heat as, for example, by heating at the reflux temperature of the reaction mixture. The following equation, wherein $\Delta^{22}$-5β-cholenic acid halide (IIa, infra) is the starting material employed illustrates this method of preparation; however, it is to be understood that other isomeric derivatives of the said acid halide may be substituted therefor in an otherwise analogous method to afford the corresponding isomeric 5β-taurocholenic and 5β-taurocholadienic acid derivatives:

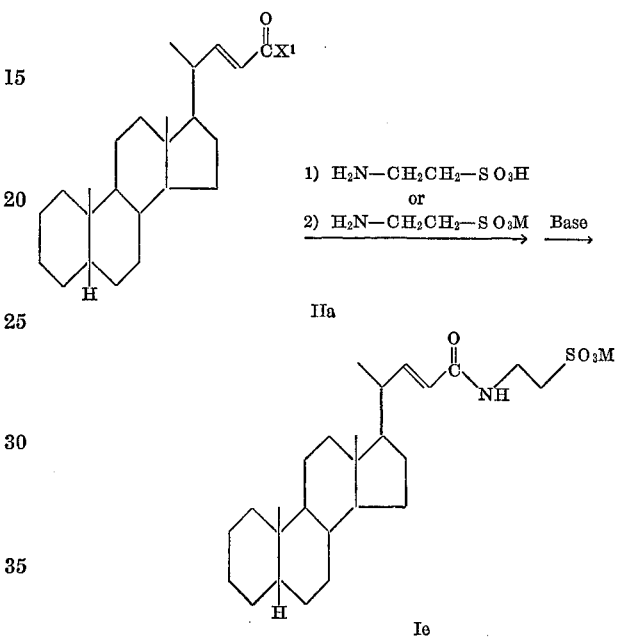

wherein $X^1$ is halo, for example, chloro, bromo, iodo and the like and M is as defined above. The cholenoyl and choladienoyl halides employed as starting materials in the foregoing method are conveniently obtained via the reaction of the corresponding cholenic acid or choladienic acid with a suitable halogenating agent as, for example, with thionyl chloride and the like. Upon removal of any excess halogenating agent the acid halide thus obtained is usually of sufficient purity as to be useable directly as the starting material in the foregoing preparative method.

The $\Delta^{22}$-5β-cholenic acids (II) employed as starting materials in the foregoing methods of preparation are conveniently obtained by treating 5β-cholanic acid (V, infra) with an appropriate halogenating agent and then with an alkanol or with water to yield, respectively, the corresponding alkyl 5β-23-halocholanate or 5β-23-halocholanic acid (VI, infra) and the said ester or carboxylic acid intermediate thus obtained is then dehydrohalogenated to the corresponding alkyl trans-$\Delta^{22}$-5β-cholenate or trans-$\Delta^{22}$-5β-cholenic acid derivative (VII, infra) by treatment with a suitable reagent as, for example, by treatment with sodium bromide and calcium carbonate in dimethylformamide. Also, when the intermediate subjected to dehydrohalogenation is the alkyl trans-$\Delta^{22}$-5β-cholenate corresponding to Formula VII, infra, wherein $R^2$ is alkyl, then the said intermediate may be hydrolyzed to the corresponding acid by treatment with an aqueous solution of a base and then with an acid to yield the desired $\Delta^{22}$-5β-cholenic acid (II). In practice, it is usually desirable to purify the alkyl $\Delta^{22}$-5β-cholenate intermediate (VII) of the foregoing method by extraction with a suitable solvent. In general, any diluent in which the said cholenate intermediate (VII) is selectively soluble may be employed as, for example, carbon tetrachloride, chloroform or a methylene halide such as methylene chloride and the like; however, it has been found that hydrocarbons are especially suitable for this purpose inasmuch as they are more selective in solubilizing the alkyl $\Delta^{22}$-5$\beta$-cholenate intermediate (VII). Hydrocarbons which have been found to be particularly suitable as extraction solvents include, for example, hexane, cyclohexane, ligroin, kerosene and the like. The following equation, wherein the halogenating agent employed is bromine in a mixture of carbon tetrachloride and phosphorus tribromide and wherein the dehydrohalogenating agent is sodium bromide and calcium carbonate in dimethylformamide, illustrates the foregoing method of preparation; however, it is to be understood that other functionally equivalent halogenating and dehydrohalogenating agents may be substituted therefor and the process conducted in an otherwise similar manner to yield an identical $\Delta^{22}$-5$\beta$-cholenic acid (II):

hydrolyze the former (i.e., VI) in the conventional manner by treatment with an aqueous solution of a base to yield a 5$\beta$-23-halocholanic acid. The halocholanic acid compound thus obtained also exhibits hypocholesterolemic activity and, therefore, can also be used in the treatment of conditions associated with blood lipid deposition.

The foregoing is a convenient method for the preparation of the trans-$\Delta^{22}$-5$\beta$-cholenic acid starting materials (II) but, unfortunately, it is not suitable for the preparation of the corresponding cis isomers. The said cis-$\Delta^{22}$-5$\beta$-cholenic acids are obtained by treating 23-nor-24-hydroxy-5$\beta$-cholane (VIII, infra) with a suitable oxidizing agent as, for example, with a mixture of chromium trioxide and sulfuric acid and the 23-nor-24-oxo-5$\beta$-cholane (IX, infra) thus obtained is then halogenated to the corresponding 23-nor-24-dihalo-5$\beta$-cholane (X, infra) and the latter subjected to dehydrohalogenation to yield 20$\alpha$-ethynyl-5$\beta$-pregnane (XI, infra); the ethynyl compound (XI) thus obtained is then treated with methyl lithium in the presence of carbon dioxide and then with an aqueous solution of an acid such as hydrochloric acid to yield a 22-5$\beta$-cholynic acid (XII, infra) which is then subjected to catalytic hydrogenation as, for example, by treating the 22-5$\beta$-cholynic acid (XII) with hydrogen in the presence of a lead-poisoned palladium on calcium carbonate catalyst, i.e., a Lindlar catalyst, to yield the desired cis-$\Delta^{22}$-5$\beta$-cholenic acid (IIb). The following equation illustrates this method of preparation; however, the phosphorus pentachloride halogenating agent, sodamide dehydrohalogenating agent and hydrogenation catalyst depicted therein are only illustrative of the wide variety of reagents which may be employed and it will be apparent to those skilled in the art that other functionally equivalent reagents may be substituted therefor and the process conducted in an otherwise analogous manner to yield an identical cis-$\Delta^{22}$-5$\beta$-cholenic acid compound:

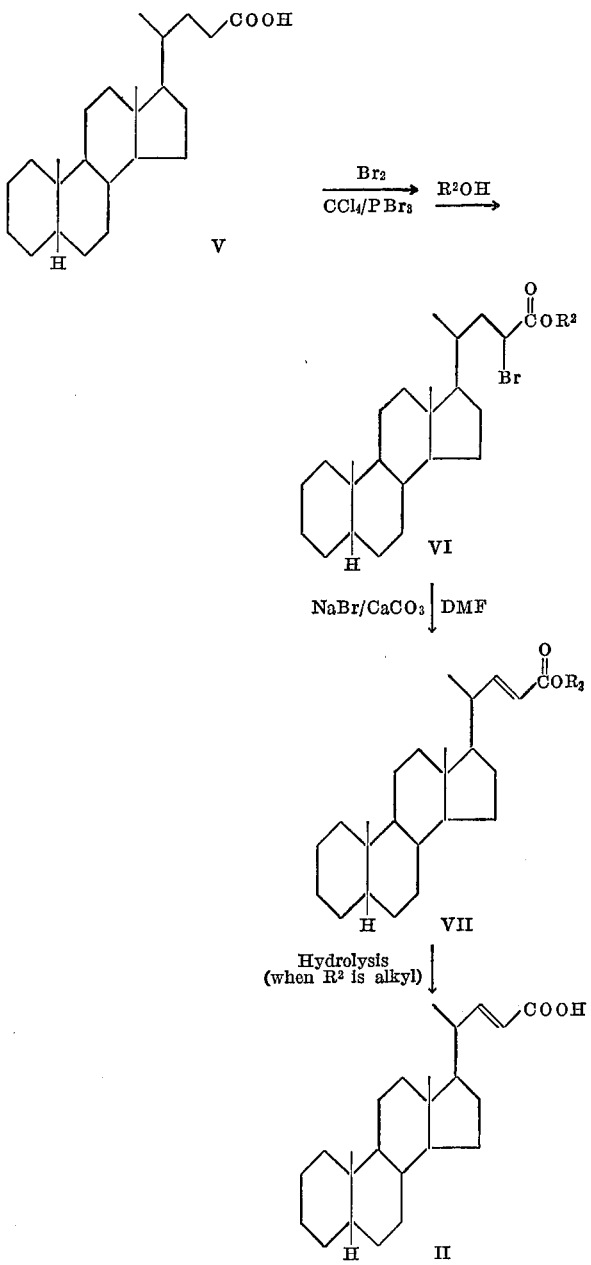

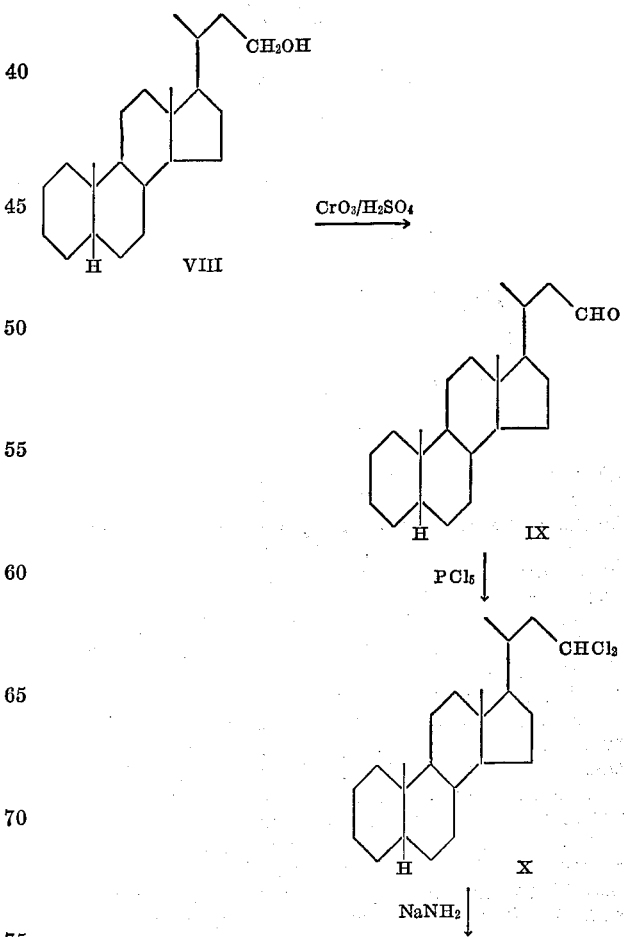

wherein $R^2$ is hydrogen or alkyl, for example, lower alkyl such as methyl, ethyl, etc. and $R^2$OH is water or an alkanol, for example, a lower alkanol such as methanol, ethanol, etc. Also, in lieu of converting the alkyl 5$\beta$-23-halocholanate intermediate (VI, supra) to its corresponding alkyl $\Delta^{22}$-5$\beta$-cholenate (VII, supra) it is possible to

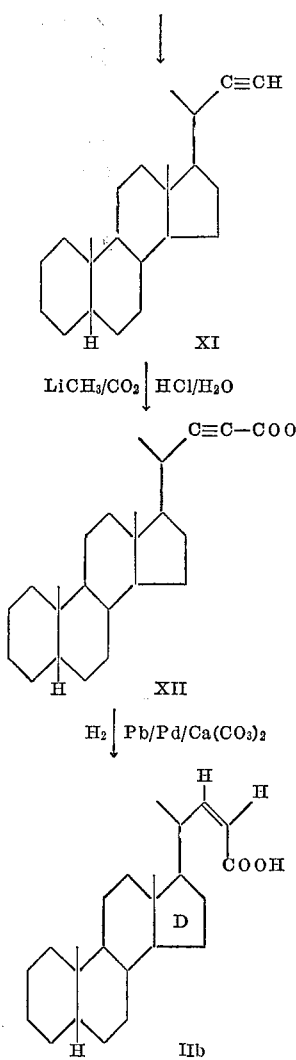

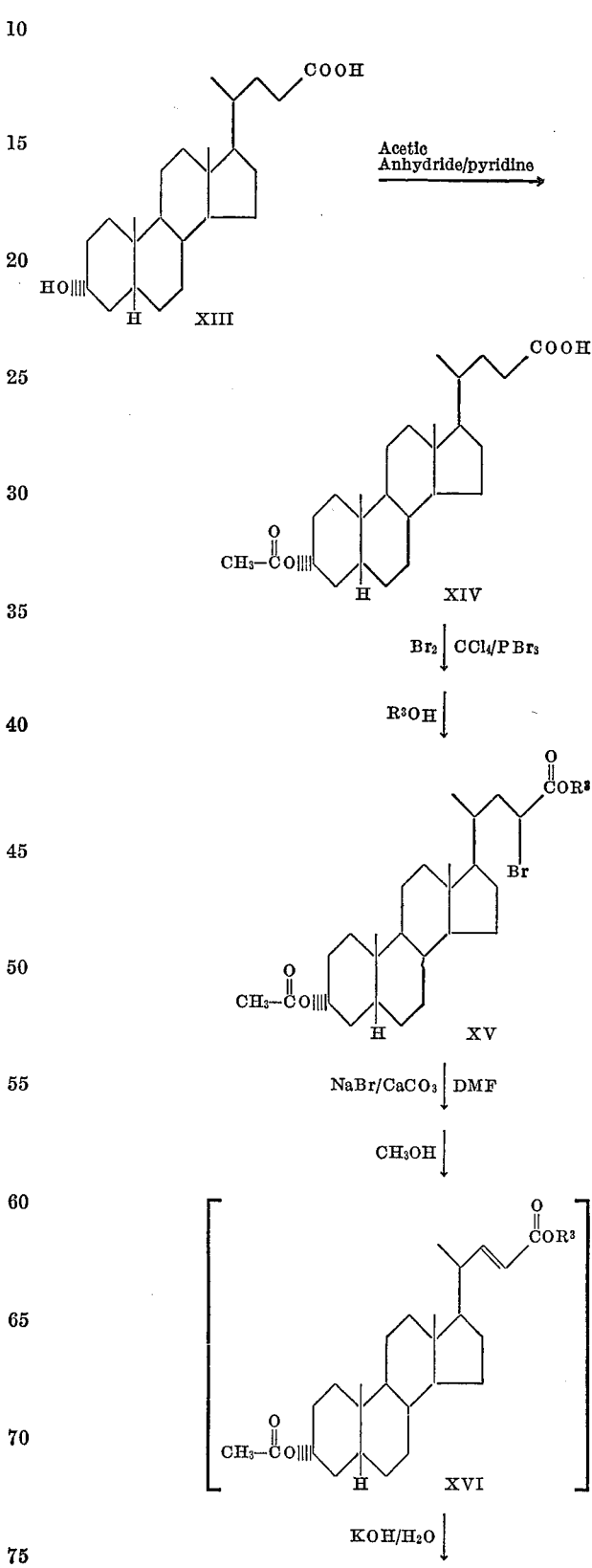

acid (XIII), illustrates the process; however, it will be appreciated by those skilled in the art that 7α-hydroxy-5β-cholanic acid and 12α-hydroxy-5β-cholanic acid, etc., may be substituted for the said 3α - hydroxy-5β-cholanic acid and the reaction conducted in an otherwise analogous manner to yield the corresponding $\Delta^7$-trans-$\Delta^{22}$-5β-choladienic acid, $\Delta^{11}$-trans-$\Delta^{22}$-5β-choladienic acid, etc.:

The 5β-choladienic acid reactants of the instant process are obtained by treating an appropriate nuclear hydroxy substituted 5β-cholanic acid (XIII, infra) with an acylating agent such as acetic anhydride in pyridine and the resulting nuclear alkanoyloxy substituted 5β-cholanic acid (XIV, infra) is then treated with an appropriate halogenating agent and then with an alkanol to yield the corresponding alkyl alkanoyloxy 5β-23-halocholanate (XV, infra), which intermediate is then dehydrohalogenated to its corresponding alkyl alkanoyloxy trans-$\Delta^{22}$-5β-cholenate (XVI, infra) by treatment with a suitable reagent as, for example, by treatment with sodium bromide and calcium carbonate in dimethylformamide; the said alkyl alkanoyloxy trans-$\Delta^{22}$-5β-cholenate (XVI) thus obtained is then hydrolyzed by treatment with an aqueous alcoholic solution of a base and then with an acid to yield the corresponding nuclear hydroxy substituted trans-$\Delta^{22}$-5β-cholenic acid (XVII, infra) which is then esterified by treatment with a lower alkanol in a strong acid such as anhydrous hydrochloric acid to yield an alkyl nuclear hydroxy substituted trans - $\Delta^{22}$ - 5β - cholenate intermediate (XVIII, infra); the cholenate intermediate (XVIII) thus obtained is then converted to its corresponding alkyl nuclear hydroxy substituted trans-$\Delta^{22}$-5β-cholenate para-toluenesulfonate (XIX, infra) by treating the former (i.e., XVIII) with para-toluenesulfonyl chloride in pyridine and the said sulfonate intermediate (i.e., XIX) is then converted to its corresponding $\Delta^3$-trans-$\Delta^{22}$-5β-choladienic acid (XX, infra) by treatment with potassium tert.-butoxide in a suitable solvent, such as dimethylsulfoxide, at raised temperatures. The following equation, wherein the cholanic acid starting material employed is 3α-hydroxy-5β-cholanic

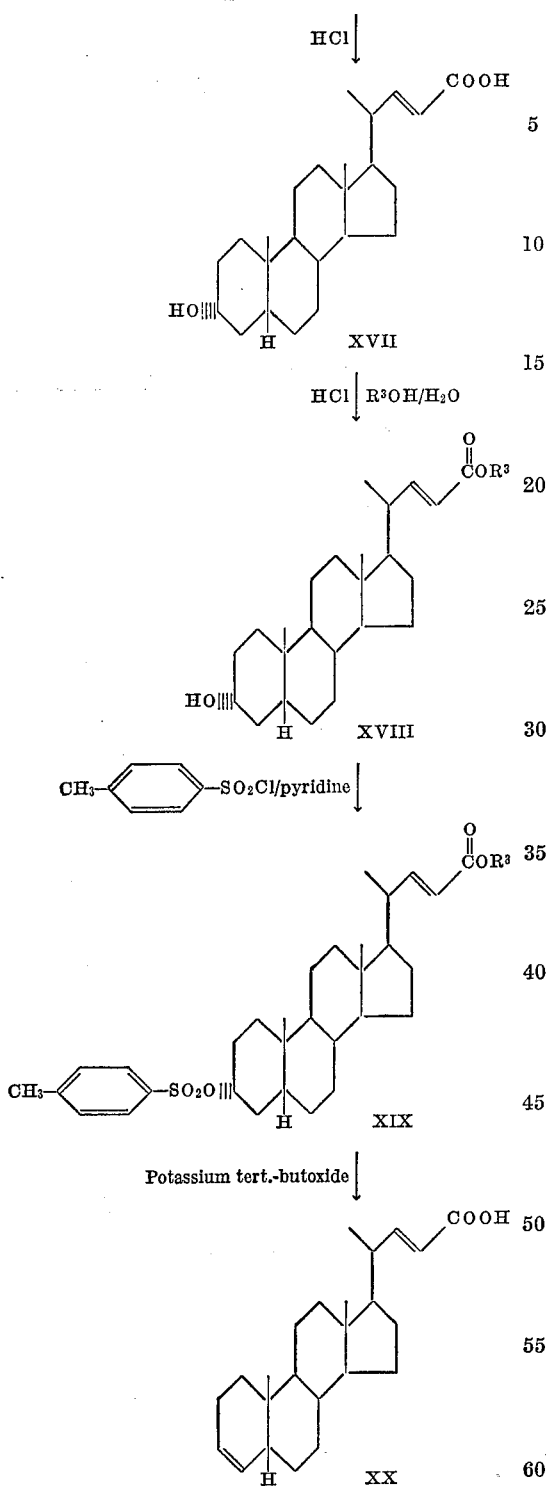

wherein R³ is alkyl, for example, loweralkyl such as methyl, ethyl and the like and R³OH is an alkanol, for example, a loweralkanol such as methanol, ethanol and the like.

Theere is no clear agreement about the actual role of cholesterol and triglyceride synthesis in the localization of atherosclerotic plaques but numerous studies support the concept that cholesterol and triglyceride play a major role in the pathogenesis of atherosclerosis because along with other lipids and fibrin they accumulate in the arterial intima and subintima to produce arterial corrosion.

Cholesterol and triglycerides are present to some extent in all ordinary diets and, also, they are synthesized by body organs from intermediates of metabolic origin; consequently, the development of a chemotherapeutic agent which will induce a significant reduction in the serum cholesterol and triglyceride level is considered desirable. To this end the 5β-taurocholenic acids and 5β-taurocholadienic acids of this invention have been tested and found to exhibit good hypocholesterolemic and hypolipemic activity. The ability of the products to inhibit and reduce the concentration of cholesterol and other lipids in serum bespeaks their usefulness as pharmacologically active compounds which have application in the treatment of conditions associated with cardiovascular disease.

The examples which follow illustrate the 5β-taurocholenic and 5β-taurocholadienic acids of this invention and the methods by which they are prepared. However, the examples are illustrative only and it will be apparent to those having ordinary skill in the art that all of the instant products may be prepared in an analogous manner by substituting the appropriate starting materials for those set forth in the examples.

EXAMPLE 1

Trans-Δ²²-5β-taurocholenic acid, potassium salt

STEP A: METHYL 5β-23-BROMOCHOLANATE

Bromine (3.6 ml.) is added slowly at room temperature to a mechanically stirred mixture of 5β-cholanic acid (25.0 g.), carbon tetrachloride (100 ml.) and phosphorus tribromide (6.9 ml.) in a 250 ml. flask fitted with a reflux condenser topped by a drying tube containing anhydrous calcium sulfate. After 30 minutes, additional bromine (13.2 ml.) is added from a dropping funnel and the mixture is refluxed for 16 hours. The dark red solution is cooled to 0–5° C. and methanol (50 ml.) is added dropwise. Esterification is completed by refluxing the mixture for one hour. The mixture is then cooled to room temperature, diluted with carbon tetrachloride (100 ml.), decolorized with decolorizing carbon (2.5 g.), filtered and evaporated to dryness in vacuo. The residual gum is dissolved in a mixture of ethyl acetate (93 ml.) and methanol (93 ml.) and the flask scratched to induce crystallization. The mixture is then evaporated under reduced pressure in a rotary evaporator at 40° C. to about 100 ml. and more methanol (200 ml.) is added. The mixture is then cooled to 0–5° C. and filtered. The product is washed with cold methanol and dried in vacuo at 50° C. to yield methyl 5β-23-bromocholanate (26.2 g., 85%) in the form of a yellow solid. Both diastereoisomeric forms of the product are present in substantially equal amounts.

*Analysis.*—Calc'd for Br (percent): 17.65. Found (percent): 17.69.

STEP B: METHYL TRANS-Δ²²-5β-CHOLENATE

Method 1.—A mixture of methyl 5β-23-bromocholanate (20.0 g.), sodium bromide (8.0 g.) and calcium carbonate (8.0 g.) in dimethylformamade (400 ml.) is heated to 130° C. in an atmosphere of nitrogen for four hours with stirring. The resulting dark solution is cooled to room temperature, inorganic material is filtered off and the solution diluted with water (2 liters) and extracted three times with 200 ml. portions of methylene chloride. The combined methylene chloride extracts are then washed with water (200 ml.), decolorized with decolorizing carbon (4.0 g.) at room temperature, filtered and evaporated to dryness in vacuo to yield a residue identified as methyl trans-Δ²²-5β-cholenate; M.P. 76–78.5° C.

Method 2.—Methyl 5β-23-bromocholanate (145 g.), sodium bromide (57.8 g.) and calcium carbonate (57.8 g.) are added to dimethylformamide (1.35 l.) and the mixture heated at 130° C. for four hours with stirring. The mixture is cooled to room temperature and filtered. The inorganic residues are washed with three 20 ml. portions of dimethylformamide and the combined filtrates diluted with water (650 ml.) and hexane (150 ml.). After stirring for 20 minutes the hexane layer is separated, concentrated in vacuo and methyl trans-$\Delta^{22}$-5$\beta$-cholenate is crystallized by the addition of methanol (400 ml.). The suspension is cooled to 0–5° C. and the product is collected on a funnel and air dried to yield 99.4 g. of methyl trans-$\Delta^{22}$-5$\beta$-cholenate; M.P. 76–78.5° C.

The methyl trans-$\Delta^{22}$-5$\beta$-cholenate intermediate described in the preceding preparative method has also been isolated, purified by chromatography over silica gel and crystallized from ethanol to yield pure compound having a melting point of 77–78° C.

*Analysis.*—Calc'd for $C_{25}H_{40}O_2$ (percent): C, 80.60; H, 10.83. Found (percent): C, 80.45; H, 11.10.

STEP C: TRANS-$\Delta^{22}$-5$\beta$-CHOLENIC ACID

The methyl trans-$\Delta^{22}$-5$\beta$-cholenate obtained according to Step B, Method 1 or Method 2, is dissolved in hot ethanol (300 ml.) and hydrolyzed by the addition of hot aqueous 10% potassium hydroxide (400 ml.) with refluxing of the reaction mixture for one hour. The dark solution is then cooled to room temperature and acidified to a pH of 2–3 with aqueous concentrated hydrochloric acid (100–120 ml.). Water (400 ml.) is added to complete precipitation. The product is filtered off, washed free of acid to yield trans-$\Delta^{22}$-5$\beta$-cholenic acid (15.0 g., 95%) in the form of a yellow solid, M.P. 152–165° C. Purification by hot chromatography (45–50° C.) in benzene over silica gel, followed by crystallization from ether yields 60% recovery of trans-$\Delta^{22}$-5$\beta$-cholenic acid as a colorless solid, M.P. 181–182° C.

*Analysis.*—Calc'd for $C_{25}H_{38}O_2$ (percent): C, 80.39; H, 10.68. Found (percent): C, 80.11; H, 10.76.

STEP D: 5$\beta$-$\Delta^{22}$-CHOLENIC ETHYLCARBONIC ANHYDRIDE

Trans-$\Delta^{22}$-5$\beta$-cholenic acid (10.0 g.) and tetrahydrofuran (139 ml.) are added to a 250 ml. flask equipped with stirrer, ice bath and thermometer. After cooling to 0–5° C. triethylamine (3.89 ml.) is added with stirring followed by the addition of ethyl chloroformate (2.69 ml.). Whereupon triethylamine hydrochloride precipitates immediately and the temperature rose to 10° C. After aging one hour at 0 to 5° C., the triethylamine hydrochloride is collected and washed with two 10 ml. portions of tetrahydrofuran maintained at 0.5° C. The filtrate is concentrated to dryness in vacuo. Acetonitrile (20 ml.) is then added and the concentration repeated. After flushing with an additional amount of acetonitrile (20 ml.) the residue is dissolved in acetonitrile (43 ml.) at reflux. Upon slowly cooling and aging at 0–5° C. for one hour, the product is collected, washed with two 10 ml. portions of cold acetonitrile and air dried at 25° C. to constant weight. There is thus obtained 10.0 g. (83%) of 5$\beta$-$\Delta^{22}$-cholenic ethylcarbonic anhydride, M.P. 92–93° C.

STEP E: TRANS-$\Delta^{22}$-5$\beta$-TAUROCHOLENIC ACID, POTASSIUM SALT

Acetone (215 ml.) is added to the 5$\beta$-$\Delta^{22}$-cholenic ethylcarbonic anhydride obtained according to Step D, followed by the addition of a solution of taurine (5.35 g.) in aqueous N-potassium hydroxide (43 ml.) and acetone (215 ml.). The mixture is stirred overnight at room temperature, cooled to 0–5° C. and the crude product (16.9 g.) filtered off as a colorless solid. The trans-$\Delta^{22}$-5$\beta$-taurocholenic acid potassium salt monohydrate thus obtained is then purified by twice recrystallizing from aqueous tetrahydrofuran followed by air drying to yield 9.5 g. of the said monohydrate in the form of a colorless solid. A thermogram by differential thermal analysis (under vacuum) showed an endotherm for the monohydrate at 235° C. and a decomposition endotherm at 356° C. The product is then dried at 100° C. for two hours to yield anhydrous trans-$\Delta^{22}$-5$\beta$-taurocholenic acid, potassium salt.

*Analysis.*—Calculated for $C_{26}H_{42}NSO_4K$ (percent): C, 61.98; H, 8.40; N, 2.78; S, 6.34. Found (percent): C, 62.20, H, 8.43; N, 2.92; S, 6.56.

EXAMPLE 2

Trans-$\Delta^{22}$-5$\beta$-taurocholenic acid sodium salt

By substituting aqueous N-sodium hydroxide (43 ml.) for the aqueous N-potassium hydroxide recited in Example 1, Step E, and following the procedure described therein the product trans-$\Delta^{22}$-5$\beta$-taurocholenic acid sodium salt monohydrate is obtained.

The trans-$\Delta^{22}$-5$\beta$-taurocholenic acid sodium salt monohydrate is then dissolved in five parts of hot glacial acetic acid, filtered from insolubles and then precipitated at room temperature by the slow addition, with stirring, of 30 parts of acetone. The product is filtered, washed with acetone and dried in vacuo at 60° C. to yield 75% trans-$\Delta^{22}$-5$\beta$-taurocholenic acid sodium salt.

*Analysis.*—Calculated for $C_{26}H_{42}NSO_4Na$ (percent): C, 64.03; H, 8.68; N, 4.72. Found (percent): C, 64.28; H, 8.80; N, 4.53.

EXAMPLE 3

Trans-ethyl $\Delta^{22}$-5$\beta$-taurocholenate

STEP A: TRANS-$\Delta^{22}$-5$\beta$-TAUROCHOLENATE SILVER SALT

A solution of silver nitrate (5.0 g.) in hot water (25 ml.) is added to a solution of trans-$\Delta^{22}$-5$\beta$-taurocholenic acid sodium salt (5.0 g.) in hot water (100 ml.) producing an immediate precipitate. The resulting precipitate is kept hot for 15 minutes, cooled to room temperature and then filtered. The silver salt is washed with water and dried in vacuo at 70° C. to yield 4.80 g. of trans-$\Delta^{22}$-5$\beta$-taurocholenate silver salt.

STEP B: TRANS-ETHYL $\Delta^{22}$-5-$\beta$-TAUROCHOLENATE

Silver $\Delta^{22}$-5$\beta$-taurocholenate (6.0 g.) is refluxed with an excess of ethyliodide for one hour, cooled to 0° C. and silver iodide filtered off with methylene chloride washing and the combined filtrates evaporated to dryness in vacuo. The residue of crude ethyl ester (6.5 g.) thus obtained is purified by chromatography in a mixture of ether and tetrahydrofuran over silica gel to yield 54% of trans-ethyl $\Delta^{22}$-5$\beta$-taurocholenate, M.P. 112–114° C.

*Analysis.*—Calculated for $C_{28}H_{47}NSO_4$ (percent): C, 68.11; H, 9.59; N, 2.84. Found (percent): C, 68.20; H, 9.49; N, 2.87.

EXAMPLE 4

Trans-$\Delta^{22}$-5$\beta$-cholenic acid taurine amide

Ethyl chloroformate (0.38 ml.) is added to a solution of trans-$\Delta^{22}$-5$\beta$-cholenic acid (1.44 g.) in tetrahydrofuran (20 ml.) and triethylamine (0.56 ml.) at 0–5° C. and the 5$\beta$-$\Delta^{22}$-cholenic ethylcarbonic anhydride intermediate thus obtained is maintained at that temperature for one hour. Taurine amide hydrochloride (0.642 g.) in water (4 ml.) containing triethylamine (0.56 ml.) is then added and the mixture is maintained at room temperature for four hours. The mixture is then evaporated to dryness in vacuo and the residue dissolved in chloroform. The solution is washed with water, dried over magnesium sulfate, filtered and evaporated in vacuo to yield crude trans-$\Delta^{22}$-5$\beta$-cholenic acid taurine amide in the form of a gummy solid. The crude product is then dissolved in tetrahydrofuran (9 ml.), filtered and petroleum ether (30 ml.) is added to precipitate the trans-$\Delta^{22}$-5$\beta$-cholenic acid taurine amide in the form of a gummy solid. The crude product is then dissolved in tetrahydrofuran (9 ml.), filtered and petroleum ether (30 ml.) is added to precipitate the trans-$\Delta^{22}$-5$\beta$-cholenic acid taurine amide (1.2 g.), a colorless solid. The product is further purified by repeating the precipitation and drying the resulting solid in vacuo.

*Analysis.*—Calculated for $C_{26}H_{44}N_2SO_3$ (percent): C, 66.96; H, 9.68; N, 5.94. Found (percent): C, 67.20; H, 9.55; N, 6.03.

EXAMPLE 5

$\Delta^3$-5β-taurocholenic acid potassium salt

By substituting $\Delta^3$-5β-cholenic acid for the trans-$\Delta^{22}$-5β-cholenic acid of Example 1, Step D, and following the procedure described therein the product $\Delta^3$-5β-taurocholenic acid potassium salt, M.P. 225–235° C. is obtained.

*Analysis.*—Calculated for $C_{26}H_{42}NSO_4K$ (percent): C, 61.98; H, 8.40. Found (percent): C, 61.87; H, 8.76.

EXAMPLE 6

$\Delta^6$-5β-taurocholenic acid potassium salt

By substituting $\Delta^6$-5β-cholenic acid for the trans-$\Delta^{22}$-5β-cholenic acid of Example 1, Step D, and following the procedure described therein the product $\Delta^6$-5β-taurocholenic acid potassium salt is obtained.

EXAMPLE 7

$\Delta^7$-5β-taurocholenic acid potassium salt

By substituting $\Delta^7$-5β-cholenic acid for the trans-$\Delta^{22}$-5β-cholenic acid of Example 1, Step D, and following the procedure described therein the product $\Delta^7$-5β-taurocholenic acid potassium salt is obtained.

EXAMPLE 8

$\Delta^{9(11)}$-5β-taurocholenic acid potassium salt

By substituting $\Delta^{9(11)}$-5β-cholenic acid for the trans-$\Delta^{22}$-5β-cholenic acid of Example 1, Step D, and following the procedure described therein the product $\Delta^{9(11)}$-5β-taurocholenic acid potassium salt is obtained.

EXAMPLE 9

$\Delta^{11}$-5β-taurocholenic acid potassium salt

By substituting $\Delta^{11}$-5β-cholenic acid for the trans-$\Delta^{22}$-5β-cholenic acid of Example 1, Step D, and following the procedure described therein the product $\Delta^{11}$-5β-taurocholenic acid potassium salt is obtained.

EXAMPLE 10

$\Delta^3$-trans-$\Delta^{22}$-5β-taurocholadienic acid potassium salt

STEP A: 3α-ACETOXY-5β-CHOLANIC ACID

A solution of 3α-hydroxy-5β-cholanic acid (1 g.) in pyridine (5 ml.) and acetic anhydride (2 ml.) is refluxed for 15 minutes then cooled to room temperature. Water (0.5 ml.) is added dropwise to hydrolyze the excess of acetic anhydride and any mixed anhydride. The reaction is moderated by cooling in cold water and after 10 minutes the warm solution is further diluted with water (4.5 ml.) to produce a crystalline precipitate, which is filtered off, washed with water and dried in vacuo at 60° C. to yield 3α-acetoxy-5β-cholanic acid.

STEP B: METHYL 3α-ACETOXY-5β-23-BROMOCHOLANATE

By substituting 3α-acetoxy-5β-cholanic acid for the 5β-cholanic acid of Example 1, Step A, and following the procedure therein the compound methyl 3α-acetoxy-5β-23-bromocholanate is obtained.

STEP C: 3α-HYDROXY-TRANS-$\Delta^{22}$-5β-CHOLENIC ACID

By substituting methyl 3α-acetoxy-5β-23-bromocholanate for the methyl 5β-23-bromocholanate of Example 1, Step B, Method 1 or Method 2 and following the procedure described therein the compound 3α-hydroxy-trans-$\Delta^{22}$-5β-cholenic acid is obtained.

STEP D: METHYL 3α-HYDROXY-TRANS-$\Delta^{22}$-5β-CHOLENATE

3α-hydroxy-trans-$\Delta^{22}$-5β-cholenic acid (10 g.) is dissolved in anhydrous methanol (50 ml.) and gaseous hydrogen chloride (0.5 g.) is bubbled into the mixture. The solution is then boiled under reflux for 15 minutes, concentrated in vacuo while still hot to induce crystallization and then cooled to room temperature. The product is then filtered, washed with methanol and dried in vacuo to yield methyl 3α-hydroxy-trans-$\Delta^{22}$-5β-cholenate in the form of a colorless crystalline solid.

STEP E: METHYL 3α-HYDROXY-TRANS-$\Delta^{22}$-5β-CHOLENATE-3-PARA-TOLUENESULFONATE A solution of methyl 3α-hydroxy-trans-$\Delta^{22}$-5β-cholenate (4.00 g.) and para-toluenesulfonyl chloride (2.34 g., 1.20 mol ratio) in pyridine (10 ml.) is heated to 60° C. for 24 hours. The solution is then cooled to room temperature and diluted slowly with water (30 ml.) while stirring vigorously. A precipitate is obtained which is filtered off, thoroughly washed with water and dried in vacuo to yield methyl 3α-hydroxy-trans-$\Delta^{22}$-5β-cholenate 3-paratoluenesulfonate.

STEP F: $\Delta^3$-TRANS-$\Delta^{22}$-5β-CHOLADIENIC ACID

Methyl 3α-hydroxy-trans-$\Delta^{22}$-5β-cholenate 3 - para-toluenesulfonate is added to a solution of potassium tertiary butoxide in dimethyl sulfoxide and the mixture heated to a temperature of 100–110° C. for one hour. The solution is then cooled, diluted with 5 volumes of cold water, and acidified with aqueous concentrated hydrochloric acid. The resulting precipitate is washed with cold water and dried in vacuo to yield $\Delta^3$-trans-$\Delta^{22}$-5β-choladienic acid.

STEP G: $\Delta^3$-TRANS-$\Delta^{22}$-5β-TAUROCHOLADIENIC ACID POTASSIUM SALT

By substituting the $\Delta^3$-trans-$\Delta^{22}$-5β-choladienic acid of Step F for the trans-$\Delta^{22}$-5β-cholenic acid of Example 1, Step D, and following the procedure described therein the product $\Delta^3$-trans-$\Delta^{22}$-5β-taurocholadienic acid potassium salt is obtained.

EXAMPLE 11

$\Delta^7$-trans-$\Delta^{22}$-5β-taurocholadienic acid potassium salt

By substituting 7α-hydroxy-5β-cholanic acid for the 3α-hydroxy-5β-cholanic acid of Example 10, Step A, and following the procedure described in Steps A–G of that example the product $\Delta^7$-trans-$\Delta^{22}$-5β-taurocholadienic acid potassium salt is obtained.

EXAMPLE 12

$\Delta^{11}$-trans-$\Delta^{22}$-5β-taurocholadienic acid potassium salt

By substituting 12α-hydroxy-5β-cholanic acid for the 3α-hydroxy-5β-cholanic acid of Example 10, Step A, and following the procedure described in Steps A–G of that example the product $\Delta^{11}$-trans-$\Delta^{22}$-5β-taurocholadienic acid potassium salt is obtained.

EXAMPLE 13

Cis-$\Delta^{22}$-5β-taurocholenic acid potassium salt

STEP A: 23-NOR-24-OXO-5β-CHOLANE

An aqueous 8 N solution of chromium trioxide in sulfuric acid (0.75 ml., 2.0 equivalents) is added dropwise over a 25-minute period to a vigorously stirred solution of 23-nor-24-hydroxy-5β-cholane (1.00 g., 2.0 equivalents) in acetone (75 ml.) at 20° C. The mixture is then diluted with ether (100 ml.) and water (500 ml.) and the ethereal layer is washed with aqueous 0.1 N sodium hydroxide and then with water, dried over magnesium sulfate, filtered and evaporated to yield 23-nor-24-oxo-5β-cholane (0.627 g.) in the form of a colorless solid. A portion of the compound is purified by chromatography in a mixture of benzene and petroleum over silica gel, followed by crystallization from ethanol to yield pure 23-nor-24-oxo-5β-cholane, M.P. 102.5–104° C.

*Analysis.*—Calculated for $C_{23}H_{38}O$ (percent): C, 83.55; H, 11.58. Found (percent): C, 83.03; H, 11.48.

STEP B: 23-NOR-24-DICHLORO-5β-CHOLANE

A solution of 23-nor-24-oxo-5β-cholane (0.627 g., 1.0 mole) in benzene (5 ml.) is added dropwise over a 5-minute period to a suspension of phosphorous pentachloride (0.500 g., 1.25 mole) in benzene (4 ml.) at 20° C. The mixture is stirred at room temperature for 17 hours and is then poured into a mixture of crushed ice and petroleum. The petroleum layer is washed with aqueous sodium bicarbonate, dried over magnesium sulfate, filtered and evaporated at approximately 40° C./1 mm. The crude product thus obtained is 23-nor-24-dichloro-5β-cholane (0.710 g.) which could not be crystallized and which is obtained in the form of a gum.

STEP C: 20α-ETHYNYL-5β-PREGNANE

A 90% sodamide in oil reagent (15 g.) is added to a solution of 23-nor-24-dichloro-5β-cholane (7.76 g.) in xylene (125 ml.) and the mixture heated under reflux for four hours with stirring. The mixture is then cooled to room temperature and poured into a mixture of crushed ice and petroleum. Some insolubles are filtered off from the petroleum layer and the organic solution is then washed with water, dried over magnesium sulfate, filtered and evaporated in vacuo. The residue is chromatographed in petroleum over a column of basic alumina to yield 20α-ethynyl-5β-pregnane in the form of a crystalline solid (1.60 g.). A portion of the product is recrystallized from ethanol to yield pure 20α-ethynyl-5β-pregnane having a melting point of 129–133° C.

*Analysis.*—Calculated for $C_{23}H_{36}$ (percent): C, 88.39; H, 11.61. Found (percent): C, 88.38; H, 11.50.

STEP D: 22-5β-CHOLYNIC ACID 1.68 M–lithium methyl solution (16 ml.) is added to a solution of 20α-ethynyl-5β-pregnane (1.62 g.) in ether (10 ml.) at 20° C. causing vigorous evolution of methane and formation of a precipitate. The mixture is exposed to an atmosphere of carbon dioxide at 800 pounds per square inch pressure at room temperature for 17 hours and the mixture is then diluted with ether (100 ml.), washed with aqueous hydrochloric acid and then with water, dried over magnesium sulfate, filtered and evaporated in vacuo. The crude residue thus obtained is crystallized on trituration with petroleum to yield 0.86 g. of 22-5β-cholynic acid, M.P. 155–160° C. A portion of the product recrystallized from hexane yields pure 22-5β-cholynic acid which also melts at 155–160° C.

*Analysis.*—Calculated for $C_{24}H_{36}O_2$ (percent): C, 80.85; H, 10.18. Found (percent): C, 81.30; H, 10.39.

STEP E: CIS-Δ²²-5β-CHOLENIC ACID 25-5β-cholynic acid (125 mg.) is selectively reduced to the cis-olefin in ethanol solution (10 ml.) employing a pre-reduced lead-poisoned palladium on calcium carbonate catalyst and hydrogen at atmospheric pressure. The catalyst is filtered off through diatomaceous earth and the filtrate evaporated in vacuo. The crude product is purified by thin-layer chromatography over silica gel using a mixture of chloroform and 6% methanol and is then recrystallized from methanol to yield 64 mg. of cis-Δ²²-5β-cholenic acid, M.P. 137–147° C. A portion of the product recrystallized from methanol yields pure cis-Δ²²-5β-cholenic acid having a melting point of 151–153° C.

*Analysis.*—Calculated for $C_{24}H_{38}O_2$ (percent): C, 80.39; H, 10.68. Found (percent): C, 80.10; H, 10.87.

STEP F: CIS-Δ²²-5β-TAUROCHOLENIC ACID POTASSIUM SALT

By substituting cis-Δ²²-5β-cholenic acid for the trans-Δ²²-5β-cholenic acid of Example 1, Step D, and following the procedure described therein the product cis-Δ²²-5β-taurocholenic acid potassium salt is obtained.

EXAMPLE 14

5β-23-fluorocholanic acid

STEP A: METHYL 5β-23-FLUOROCHOLANIC ACID

Potassium fluoride dihydrate (5.23 g.) is suspended in diethylene glycol (80 ml.) and is dehydrated by heating to 240° C. for 10 minutes. The mixture becomes homogeneous and remains so on cooling to 160° C. Methyl 5β-23-bromocholanate (5.00 g.) is then added to the hot reagent, forming a clear solution which is maintained at 160° C. for 20 hours in an atmosphere of nitrogen. The solution is then cooled, diluted with aqueous 0.5 N hydrochloric acid (250 ml.) and extrated with two 100 ml. portions of ether. The combined ethereal extracts are dried over magnesium sulfate, filtered and evaporated in vacuo to yield crude 5β-23-fluorocholanic acid. The product thus obtained is then purified by conversion to its corresponding methyl ester according to the method described in the following paragraph and the ester is then converted to the corresponding carboxylic acid according to the method described in Step B, infra.

The crude 5β-23-fluorocholanic acid is converted to its methyl ester by dissolving the acid in methanol (50 ml.) containing concentrated sulfuric acid. The solution is left at room temperature overnight, the methanol is removed in vacuo, the residual oil is dissolved in ether (200 ml.), washed free of sulfuric acid with an excess of equeous sodium bicarbonate and the ethereal soluiton dried, filtered and evaporated in vacuo to yield methyl 5β-23-fluorocholanate (4.31 g.). The ester product thus obtained is then subjected to chromatography in benzene (2 parts) and petroleum (1 part) over silica gel to yield 2.80 g. of a diastereoisomeric mixture of pure methyl 5β-23-fluorocholanate (65%), M.P. 89–96° C.

*Analysis.*—Calculated for $C_{25}H_{41}FO_2$ (percent): C, 76.47; H, 10.53, F, 4.83. Found (percent(: C, 76.73; H, 10.56; F, 5.20.

STEP B: 5β-23-FLUOROCHOLANIC ACID

Methyl 5β-23-fluorocholanate (2.80 g.) is dissolved in hot ethanol (15 ml.) and potassium hydroxide (1.20 g.) in water (15 ml.) is added and the mixture heated to boiling with slow distillation of the ethanol for 20 minutes. The hot solution is acidified with aqueous concentrated hydrochloric acid and the resulting steroid is extracted with two 50 ml. portions of ether. The combined ethereal extracts are then washed with water (20 ml.), dried over magnesium sulfate, filtered and evaporated in vacuo to yield 5β-23-fluorocholanic acid as a crystalline solid (2.76 g.). Recrystallization from hexane containing a trace of ether yields 2.31 g. of 5β-23-fluorocholanic acid, M.P. 135–148° C. Repeated recrystallization of a small sample for analysis raised the melting point of the 5β-23-fluorocholanic acid to 155–157° C.

*Analysis.*—Calculated for $C_{34}H_{39}FO_2$ (percent): C, 76.15; H, 10.39; F, 5.02. Found (percent): C, 76.31; H, 10.26; F, 4.90.

EXAMPLE 15

5β-23-chlorocholanic acid

Iodine (0.5 g.) is added to a solution of 5β-cholanic acid (25 g.) in sulfuryl chloride (100 ml.) and the mixture is heated under reflux in a water bath at 65° C. for two hours and then gradually heated to boiling under reflux for two hours. The excess of sulfuryl chloride is removed by distillation in vacuo and the residue is stirred vigorously with water (200 ml.) for 30 minutes. The crude 5β-23-chlorocholanic acid thus obtained is a colorless solid which is filtered off, washed with hot water, dried in vacuo and recrystallized from ethanol to yield pure 5β-23-cholorocholanic acid.

EXAMPLE 16

Trans-$\Delta^{22}$-5$\beta$-taurocholenic acid, potassium salt

STEP A: TRANS-$\Delta^{22}$-5$\beta$-CHOLENOYL CHLORIDE

A solution of $\Delta^{22}$-5$\beta$-cholenic acid (8.5 g.) in thionyl chloride (40 ml.) is heated at 45–55° C. for 30 minutes, after which excess thionyl chloride is removed in vacuo. Upon removal of the thionyl chloride a crystalline solid identified as cholenoyl chloride (8.9 g.) is obtained.

STEP B: TRANS-$\Delta^{22}$-5$\beta$-TAUROCHOLENIC ACID, POTASSIUM SALT

Method 1.—A solution of cholenoyl chloride (8.9 g., 23.6 mmoles) in tetrahydrofuran (150 ml.) is cooled to −20° C. and treated over one hour with a solution of taurine (2.95 g., 23.6 mmoles) in water (5 ml.) containing 47.2 milliequivalents of potassium hydroxide. Stirring is continued at −20° C. for two hours after which the mixture is heated to reflux. The reaction mixture is cooled to room temperature and the resulting product is collected on a funnel and then washed with tetrahydrofuran and water. After air drying there is obtained 11.0 g. of trans-$\Delta^{22}$-taurocholenic acid, potassium salt monohydrate. A differential thermal analysis for the monohydrate (vacuum) showed an endotherm at 235° C. and a decomposition endotherm at 356° C. Drying in vacuo at 100° C. for two hours, yields the anhydrous potassium salt of trans-$\Delta^{22}$-5$\beta$-taurocholenic acid.

Method 2.—A mixture of cholenoyl chloride (8.9 g., 23.5 mmoles) and the potassium salt of taurine (4.0 g.) in acetone (150 ml.) is treated with anhydrous potassium carbonate (3.4 g.) at reflux for three hours. Water (150 ml.) is added and the product collected by filtration. The potassium trans-$\Delta^{22}$-5$\beta$-taurocholenate monohydrate thus obtained is washed with two 100 ml. portions of water and then dried to yield 10.5 g. of trans-$\Delta^{22}$-5$\beta$-taurocholenic acid, potassium salt monohydrate. Differential thermal analysis (vacuum) endotherm 236° C.; endotherm 355° C. (dec.).

EXAMPLE 17

Trans-$\Delta^{22}$-5$\beta$-taurocholenic acid, potassium salt

STEP A: METHYL 5$\beta$-23-BROMOCHOLANATE

Cholanic acid (155 g.) is added over 30 minutes to thionyl chloride (620 ml.) at 40–60° C., after which the mixture is heated to reflux and bromine (27.6 ml.) is added. The reaction is completed within 10–15 hours. Excess thionyl chloride is removed by distillation and the intermediate 23-bromo-5$\beta$-cholanoyl chloride is diluted with benzene (200 ml.). Methanol (46 ml.) is then added to the mixture at 72–77° C. over 45 minutes and the reaction mixture cooled to room temperature. The benzene solution of methyl 5$\beta$-23-bromocholanate is washed with two 100 ml. portions of water and then concentrated by distillation of benzene.

STEP B: METHYL TRANS-$\Delta^{22}$-5$\beta$-CHOLENATE

Methyl 5$\beta$-23-bromocholanate (145 g.), sodium bromide (57.8 g.) and calcium carbonate (57.8 g.) are added to dimethylformamide (1.35 l.) and the mixture heated to 130° C. for four hours with stirring. The mixture is cooled to room temperature and filtered. The inorganic residues are washed with three 20 ml. portions of dimethylformamide and the combined filtrates diluted with water (650 ml.) and hexane (150 ml.). After stirring for 20 minutes the hexane layer is separated and concentrated in vacuo. Methyl trans-$\Delta^{22}$-5$\beta$-cholenate is crystallized by the addition of methanol (400 ml.). The suspension is cooled to 0–5° C. and the product is collected on a funnel and air dried to yield 99.4 g. of methyl trans-$\Delta^{22}$-5$\beta$-cholenate; M.P. 76–78.5° C.

STEP C: TRANS-$\Delta^{22}$-5$\beta$-CHOLENIC ACID

The methyl trans-$\Delta^{22}$-5$\beta$-cholenate obtained according to Step B is treated with ethanol (830 ml.) containing water (330 ml.) and sodium hydroxide (12.8 g.) and refluxed for two hours. The solution is cooled to 75° C. and then added to a solution of concentrated hydrochloric acid (40 ml.) in water (3.3 l.) The suspension of cholenic acid is cooled to room temperature collected on a funnel, washed with three 300 ml. portions of water and then dried at 45° C. in vacuo to constant weight to yield 98.3 g. of trans-$\Delta^{22}$-5$\beta$-cholenic acid; M.P. 181–182.5° C.

STEP D: TRANS-$\Delta^{22}$-5$\beta$-TAUROCHOLENIC ACID, POTASSIUM SALT

A suspension of 20 g. of trans-$\Delta^{22}$-5$\beta$-cholenic acid (20.0 g.) in acetone (400 ml.) is treated with triethylamine (8.16 ml.). The mixture is cooled to 0–5° C. and ethyl chloroformate (5.58 ml.) is added over a 15 minute period. The reaction is aged at 0–5° C. for two hours and then treated with a solution of taurine (7.7 g.) in water (25 ml.) containing 4.63 N potassium hydroxide (12.6 ml.). The reaction is warmed to room temperature and aged for three hours. Potassium taurocholenate monohydrate is isolated by filtration and washed with acetone (100 ml.) followed by two 100 ml. portions of water. After drying the monohydrate has a weight of 25.5 g. A thermogram by differential thermal analysis (vacuum) indicated an endotherm for the monohydrate at 235° C. and a decomposition endotherm at 356° C. Drying in vacuo at 100° C. for two hours affords anhydrous trans-$\Delta^{22}$-5$\beta$-taurocholenic acid, potassium salt.

EXAMPLE 18

Trans-$\Delta^{22}$-5$\beta$-taurocholenic acid, potassium salt

STEP A: 5$\beta$-23-BROMOCHOLANIC ACID

Method 1.—Cholanic acid (155 g.) is added over 30 minutes to thionyl chloride (620 ml.) at 40–60° C., after which the mixture is heated to reflux and bromine (27.6 ml.) is added. The reaction is completed within 10–15 hours. Excess thionyl chloride is removed by distillation and the intermediate 23-bromo-5$\beta$-cholanoyl chloride is diluted with benzene (200 ml.). Water (46 ml.) is then added to the mixture at 72–77° C. over 45 minutes and the benzene layer is separated and concentrated to a residue. Recrystallization from hexane yields 105 g. of pure 5$\beta$-23-bromocholanic acid; M.P. 172.5–180° C.

Method 2.—A solution of potassium hydroxide (0.381 g., 1 equivalent) in water (5 ml.) is added to a solution of methyl 5$\beta$-23-bromocholanate (3.00 g.) in boiling ethanol (15 ml.). An oily precipitate is immediately obtained but upon standing for approximately one minute the mixture becomes homogeneous. The solution is refluxed for four minutes, cooled to room temperature, acidified with aqueous concentrated hydrochloric acid and the precipitate extracted with two 50 ml. portions of ether. The combined ethereal solutions are then washed with water, dried over magnesium sulfate, filtered and evaporated in vacuo to yield crude 5$\beta$-23-bromocholanic acid (2.87 g.). Recrystallization from hexane yields 1.44 g. of pure 5$\beta$-23-bromocholanic acid; M.P. 172–179° C.

A small sample of the product is purified for analysis by thin-layer chromatography in chloroform over silica gel to yield highly pure 5$\beta$-23-bromocholanic acid; M.P. 173–183° C.

*Analysis.*—Calculated for $C_{24}H_{39}BrO_2$ (percent): C, 65.59; H, 8.94. Found (percent): C, 65.74; H, 8.96.

STEP B: TRANS-$\Delta^{22}$-5$\beta$-CHOLENIC ACID

5$\beta$-23-bromocholanic acid (4.4 g.) in dimethylformamide (50 ml.) containing calcium carbonate (2.0 g.) and sodium bromide (2.0 g.) is refluxed for seven hours. The reaction is cooled to 80° C. and the inorganic material removed by filtration. The dimethylformamide solution of cholenic acid is poured into water (150 ml.) to precipitate the cholenic acid and the said product is isolated by filtration, washed with three 25 ml. portions of water and then dried in air; weight of 2.7 g. There is thus obtained 2.7 g. of trans-$\Delta^{22}$-5β-cholenic acid; M.P. 181–182° C.

STEP C: TRANS-$\Delta^{22}$-5β-TAUROCHOLENIC ACID, POTASSIUM SALT

By substituting potassium carbonate for the potassium hydroxide recited in Example 17, Step D, and following the procedure described therein the product anhydrous trans-$\Delta^{22}$-5β-taurocholenic acid, potassium salt is obtained.

The products of this invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a suitable 5β-taurocholenic acid, 5β-taurocholadienic acid or a suitable salt, ester or amide derivative thereof with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by method well known to pharmacists.

It is also within the scope of this invention to combine two or more of the compounds of this invention in a unit dosage form or to combine one or more of the compounds with other known hypocholesterolemics and hypolipemics or with other desired therapeutic and/or nutritive agents in dosage unit form.

The following example is included to illustrate the preparation of a representative dosage form:

EXAMPLE 19

Dry-filled capsules containing 50 mg. of active ingredient per capsule

|  | Per capsule mg. |
|---|---|
| Trans-$\Delta^{22}$-5β-taurocholenic acid sodium salt | 50 |
| Lactose | 144 |
| Magnesium stearate | 6 |
| Capsule Size No. 3 | 200 |

The trans-$\Delta^{22}$-5β-taurocholenic acid sodium salt is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the 5β-taurocholenic acids and 5β-taurochloladienic acids of this invention and their salt, ester and amide derivatives constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A member selected from the group consisting of:

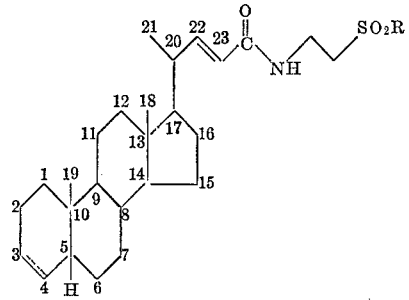

and

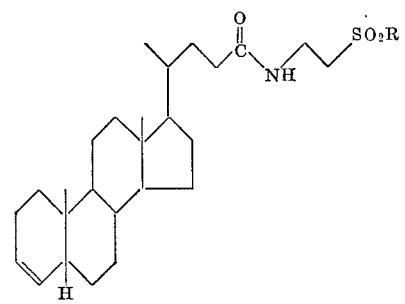

wherein R in both formulae represents hydroxy, alkoxy, —OM wherein M is a cation derived from a metal of the first group of the Periodic System or —NR$^1$R$^2$ wherein R$^1$ and R$^2$ are similar or dissimilar members selected from hydrogen and lower alkyl and, when R is hydroxy, the nontoxic, pharmacologically acceptable acid addition salts of the resulting acid; and the dotted line in the 3-position of the first formula indicates that the compound may or may not contain an unsaturated double bond within the cholane nucleus and indicates also that the said double bond may be in any other of the several isomeric positions within the nucleus.

2. A compound according to claim 1 having the formula:

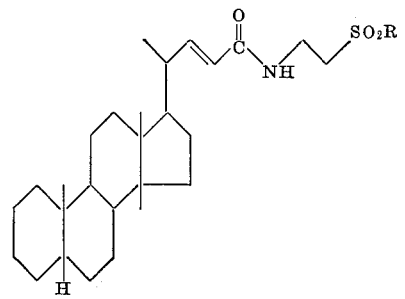

wherein R is hydroxy, alkoxy, —OM wherein M is a cation derived from a metal of the first group of the Periodic System or —NR$^1$R$^2$ wherein R$^1$ and R$^2$ are similar or dissimilar members selected from hydrogen and lower alkyl and, when R is hydroxy, the nontoxic, pharmacologically acceptable acid addition salts of the resulting acid.

3. A compound according to claim 2 having the formula:

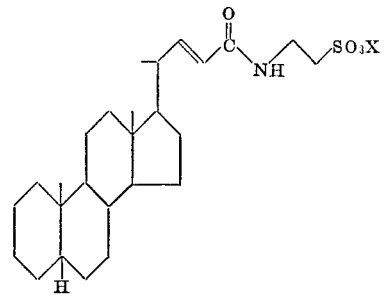

wherein X is a cation derived from a metal of the first group of the Periodic System.

4. The trans isomer of a compound according to claim 3 wherein X is a potassium cation.

5. The trans isomer of a compound according to claim 3 wherein X is a sodium cation.

6. A compound according to claim 1 having the formula:

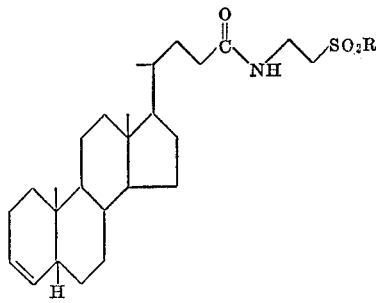

wherein R is hydroxy, alkoxy, —OM wherein M is a cation derived from a metal of the first group of the Periodic System or —NR¹R² wherein R¹ and R² are similar or dissimilar members selected from hydrogen and lower alkyl and, when R is hydroxy, the nontoxic, pharmacologically acceptable acid addition salts of the resulting acid.

7. The compound of claim 6 wherein R is a cation derived from a metal of the first group of the Periodic System.

8. The compound of claim 7 wherein the cation is a potassium cation.

9. The compound of claim 7 wherein the cation is a sodium cation.

10. A compound having the formula:

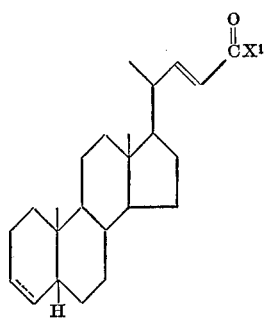

wherein X¹ is hydroxy or halo and the dotted line in the 3-position indicates that the company may or may not contain an unsaturated double bond within the cholane nucleus and indicates also that the said double bond may be in any of the several isomeric positions within the nucleus; and, when X¹ is hydroxy, the nontoxic, pharmacologically acceptable acid addition salts of the resulting acid.

11. The compound of claim 10 wherein X¹ is hydroxy.

12. The compound of claim 10 wherein the cholane ring is completely saturated.

13. The compound of claim 12 wherein X¹ is halo.

14. A compound having the formula:

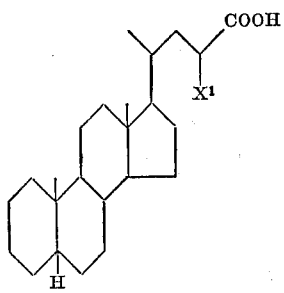

wherein X¹ is halogen; and the nontoxic, pharmacologically acceptable salts and lower alkyl esters thereof.

15. A compound according to claim 14 wherein X¹ is bromo.

16. A member selected from the group consisting of:

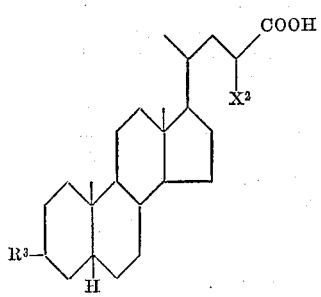

and

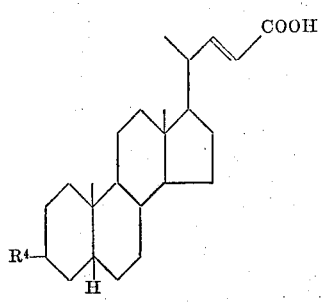

wherein R³ is lower alkanoyloxy, X² is hydrogen or halogen and R⁴ is hydroxy, lower alkanoyloxy or para-toluenesulfonyl; and the nontoxic, pharmacologically acceptable acid addition salts and lower alkyl esters thereof.

17. A member selected from the group consisting of:

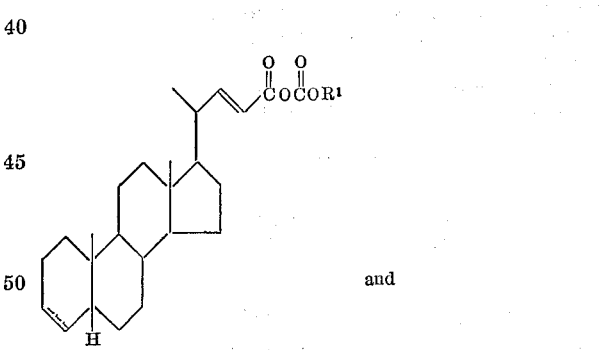

and

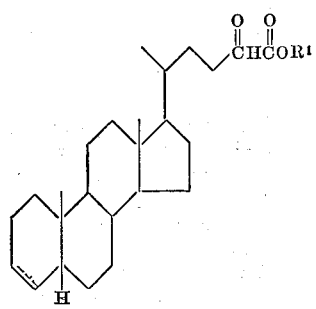

wherein R¹ is the lower alkyl and wherein the dotted line in the 3-position indicates that the compound may or may not contain an unsaturated double bond within the cholane nucleus and indicates also that the said double bond may be in any of the several isomeric positions within the nucleus.

18. The compound of claim 15 wherein the cholane ring is completely saturated.

19. A member selected from the group consisting of:

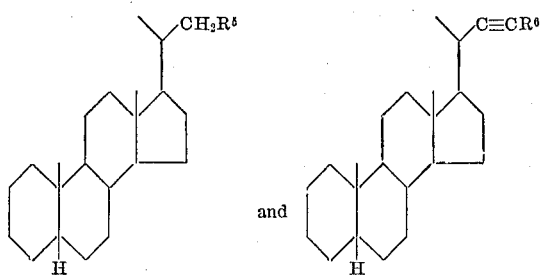

wherein $R^5$ is formyl or dihalomethyl and $R^6$ is hydrogen or carboxy.

20. A method for the preparation of:

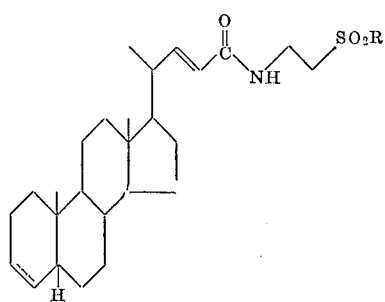

and

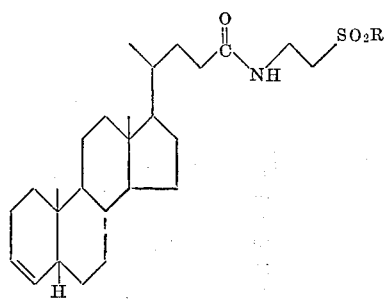

wherein R in both formulae represents hydroxy, alkoxy, —OM wherein M is a cation derived from a metal of the first group of the Periodic System, or —$NR^1R^2$ wherein $R^1$ and $R^2$ are similar or dissimilar members selected from hydrogen and lower alkyl and, when R is hydroxy, the nontoxic, pharmacologically acceptable acid addition salts of the resulting acid; and the dotted line in the 3-position of the first formula indicates that that compound may or may not contain an unsaturated double bond within the cholane nucleus and indicates also that the said double bond may be in any other of the several isomeric positions within the nucleus; which comprises treating, respectively, a 5β-cholenic alkylcarbonic anhydride or 5β-choladienic alkylcarbonic anhydride of the formula:

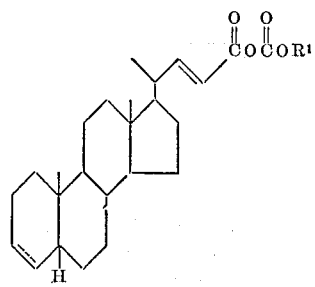

or

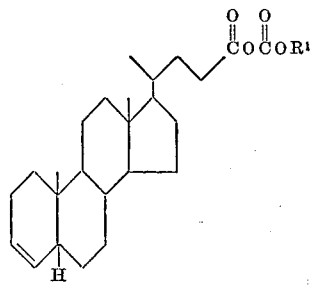

wherein $R^1$ is alkyl, with taurine in a basic medium to yield the corresponding 5β-taurocholenic acid salt or 5β-taurocholadienic acid salt and, if desired, converting the 5β-taurocholenic acid salt or 5β-taurocholadienic acid salt thus obtained to the corresponding sulfonic acid, alkyl ester, amide, monoalkylamide or dialkylamide by conventional means.

21. A method according to claim 20 for preparing a compound having the formula:

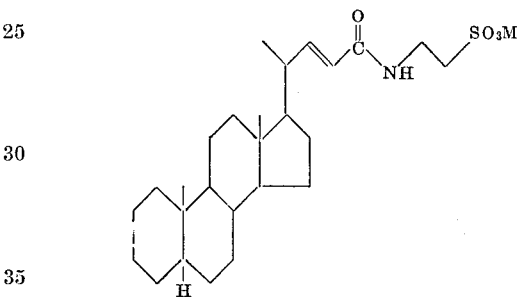

wherein M is a cation derived from a metal of the first group of the Periodic System; which comprises treating a 5β-Δ$^{22}$-cholenic alkylcarbonic anhydride of the formula:

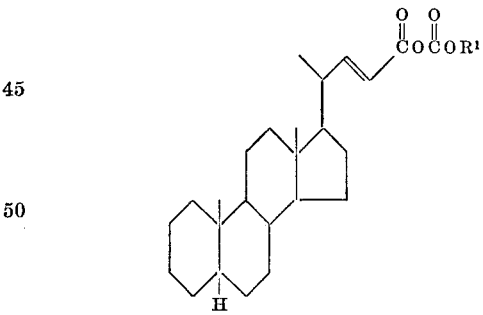

wherein $R^1$ is alkyl, with taurine in a suitable basic medium to yield the desired product.

22. The method of claim 21 wherein the basic medium is potassium hydroxide and the product of the process is trans-Δ$^{22}$-5β-taurocholenic acid, potassium salt.

23. A method for the preparation of:

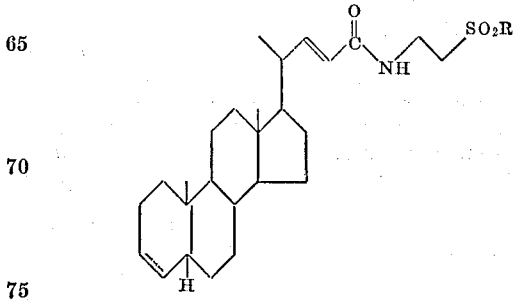

and

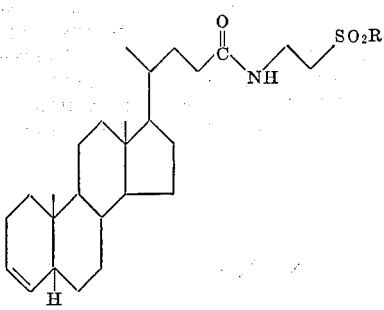

wherein R in both formulae represents hydroxy, alkoxy, —OM wherein M is a cation derived from a metal of the first group of the Periodic System or —NR¹R² wherein R¹ and R² are similar or dissimilar members selected from hydrogen and lower alkyl and, when R is hydroxy, the non-toxic, pharmacologically acceptable acid addition salts of the resulting acid; and the dotted line in the 3-position of the first formula indicates that the compound may or may not contain an unsaturated double bond within the cholane nucleus and indicates also that the said double bond may be in any other of the several isomeric positions within the nucleus; which comprises treating the corresponding 5β-cholenic acid or 5β-choladienic acid with an alkyl haloformate in the presence of a base, followed by the reaction of the 5β-cholenic alkylcarbonic anhydride or 5β-choladienic alkylcarbonic anhydride intermediate thus obtained with taurine in a basic medium to yield the corresponding 5β-taurocholenic acid salt or 5β-taurocholadienic acid salt and, if desired, converting the 5β-taurocholenic acid salt or 5β-taurocholadienic acid salt thus obtained to the corresponding sulfonic acid, alkyl ester, amide, monoalkylamide, or dialkylamide by conventional means.

24. A method according to claim 23 for preparing a compound having the formula:

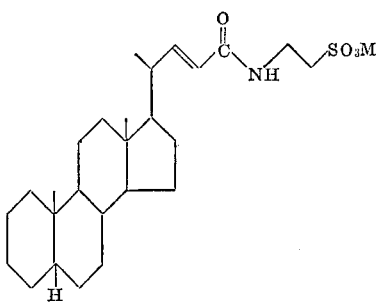

wherein M is a cation derived from a metal of the first group of the Periodic System; which comprises treating trans-Δ²²-5β-cholenic acid with an alkyl haloformate in the presence of a base, followed by the reaction of the 5β-Δ²²-cholenic alkylcarbonic anhydride thus obtained with taurine in a suitable basic medium to yield the desired product.

25. A method according to claim 24 for the preparation of trans-Δ²²-5β-taurocholenic acid, potassium salt, which comprises treating trans-Δ²²-5β-cholenic acid with alkyl chloroformate in acetone in the presence of a base, followed by the reaction of the 5β-Δ²²-cholenic alkylcarbonic anhydride thus obtained with taurine in a suitable basic medium to afford potassium taurocholenate monohydrate which, when dried, yields the anhydrous product.

26. The method of claim 25 wherein the basic medium is aqueous potassium hydroxide and the product of the reaction is trans-Δ²²-5β-taurocholenic acid, potassium salt.

27. The method of claim 25 wherein the basic medium is aqueous sodium hydroxide and the product of the reaction is trans-Δ²²-5β-taurocholenic acid, sodium salt.

28. The method according to claim 25 wherein the trans-Δ²²-5β-taurocholenic acid salt thus obtained is converted to the corresponding trans-Δ²²-5β-taurocholenic acid by treating the former with a sulfonated ion-exchange resin.

29. A method for the preparation of:

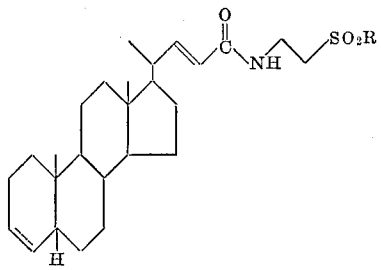

and

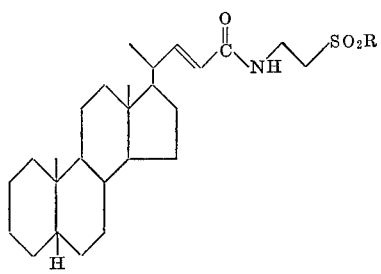

wherein R in both formulae represents hydroxy, alkoxy, —OM wherein M is a cation derived from a metal of the first group of the Periodic System, or —NR¹R² wherein R¹ and R² are similar or dissimilar members selected from hydrogen and lower alkyl and, when R is hydroxy, the non-toxic, pharmacologically acceptable acid addition salts of the resulting acid; and the dotted line in the 3-position of the first formula indicates that that compound may or may not contain an unsaturated double bond within the cholane nucleus and indicates also that the said double bond may be in any other of the several isomeric positions within the nucleus; which comprises treating a cholenic acid halide or choladienic acid halide with either taurine or an appropriate taurine salt in the presence of a base and, if desired, converting the 5β-taurocholenic acid salt or 5β-taurocholadienic acid salt thus obtained to the corresponding sulfonic acid, alkyl, ester, amide, monoalkyl amide or dialkylamide by conventional means.

30. A method according to claim 29 for preparing a compound of the formula:

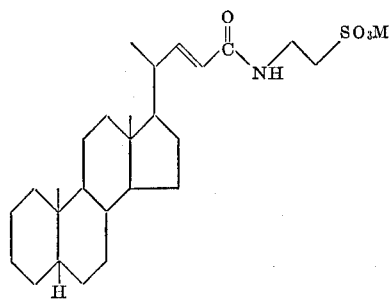

wherein M is a cation derived from a metal of the first group of the Periodic System; which comprises treating a cholenoyl halide with taurine or with the appropriate taurine salt in the presence of a suitable base.

31. A method according to claim 30 for the preparation of trans-$\Delta^{22}$-5$\beta$-taurocholenic acid, potassium salt; which comprises treating cholenoyl halide with taurine in the presence of an aqueous solution of potassium hydroxide to afford trans-$\Delta^{22}$-taurocholenic acid, potassium salt monohydrate, followed by drying of the said monohydrate to yield the desired product.

32. A method for the preparation of trans-$\Delta^{22}$-5$\beta$-cholenic acid which comprises treating 5$\beta$-cholanic acid with an appropriate halogenating agent and then with an alkanol or with water to afford, respectively, the corresponding alkyl 5$\beta$-23-halocholanate or 5$\beta$-23-halocholanic acid, which intermediate is then dehydrohalogenated to the corresponding alkyl trans-$\Delta^{22}$-5$\beta$-cholenate or trans-$\Delta^{22}$-5$\beta$-cholenic acid and, when the intermediate obtained is alkyl trans-$\Delta^{22}$-5$\beta$-cholenate, the said intermediate may be hydrolyzed to the corresponding acid by treatment with an aqueous solution of a base and then with an acid.

33. A method according to claim 32 for the preparation of trans-$\Delta^{22}$-5$\beta$-cholenic acid which comprises treating 5$\beta$-cholanic acid with an appropriate halogenating agent and then with an alkanol to obtain the corresponding alkyl 5$\beta$-23-halocholanate, dehydrohalogenating the said ester to the corresponding alkyl trans-$\Delta^{22}$-5$\beta$-cholenate and hydrolyzing the said alkyl trans-$\Delta^{22}$-5$\beta$-cholenate to the corresponding acid.

34. The method according to claim 33 wherein 5$\beta$-cholanic acid is treated with bromine in a mixture of carbon tetrachloride and phosphorous tribromide or with bromine in thionyl chloride and then with a lower alkanol to afford a lower alkyl 5$\beta$-23-bromo cholanate and the intermediate thus obtained is then dehydrohalogenated to the corresponding lower alkyl trans-$\Delta^{22}$-5$\beta$-cholenate by treatment with sodium bromide and calcium carbonate in dimethylformamide followed by the hydrolysis of the said lower alkyl trans-$\Delta^{22}$-5$\beta$-cholenate to the corresponding acid.

35. A method for the preparation of a compound having the formula:

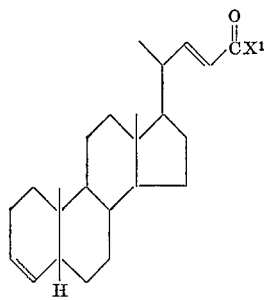

wherein $X^1$ is halo and the dotted line in the 3-position indicates that the compound may or may not contain an unsaturated double bond within the cholane nucleus and indicates also that the said double bond may be in any of the several isomeric positions within the nucleus; which comprises treating the corresponding cholenic acid or choladienic acid with a suitable halogenating agent.

36. A method according to claim 35 wherein $\Delta^{22}$-5$\beta$-cholenic acid is treated with thionyl chloride to yield cholenoyl chloride.

37. A method for the preparation of a compound having the formula:

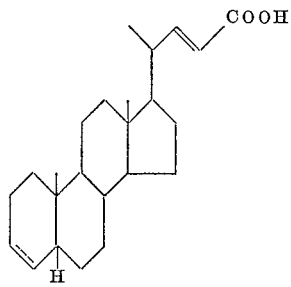

wherein the dotted line in the 3-position of the formula indicates that the product contains an unsaturated double bond within the cholane nucleus and indicates also that the said double bond may be in any other of the several isomeric positions within the nucleus; which comprises the reaction of an appropriate nuclear hydroxy substituted 5$\beta$-cholanic acid with an acylating agent, treating the resulting nuclear alkanoyloxy substituted 5$\beta$-cholanic acid with an halogenating agent and then with an alkanol to obtain the corresponding alkyl alkanoyloxy 5$\beta$-23-halocholanate and dehydrohalogenating the said intermediate to its corresponding alkyl alkanoyloxy trans-$\Delta^{22}$-5$\beta$-cholenate; the said alkyl alkanoyloxy trans-$\Delta^{22}$-5$\beta$-cholenate is then hydrolyzed to the corresponding nuclear hydroxy substituted trans-$\Delta^{22}$-5$\beta$-cholenic acid, subjected to esterification by treatment with a lower alkanol to yield an alkyl nuclear hydroxy substituted trans-$\Delta^{22}$-5$\beta$-cholenate and then converted to the corresponding alkyl nuclear hydroxy substituted trans-$\Delta^{22}$-5$\beta$-cholenate paratoluenesulfonate by treating the former with para-toluenesulfonyl chloride in pyridine, and the said sulfonate intermediate is then converted to its corresponding trans-$\Delta^{22}$-5$\beta$-choladienic acid by treatment with potassium tertiary butoxide in a suitable solvent.

38. The method of claim 37 wherein the acylating agent employed is acetic anhydride in pyridine.

39. The method of claim 37 wherein the halogenating agent is bromine in a mixture of carbon tetrachloride and phosphorous tribromide.

40. A method for the preparation of 5$\beta$-23-halocholanic acid or an alkyl ester of 5$\beta$-23-halocholanic acid which comprises treating 5$\beta$-cholanic acid with an appropriate halogenating agent and then with an alkanol or with water to afford, respectively, the corresponding alkyl 5$\beta$-23-halocholanate or 5$\beta$-23-halocholanic acid and, if desired, the alkyl 5$\beta$-23-halochonate thus obtained may be hydrolyzed to the corresponding acid by treatment with an aqueous solution of a base.

41. The process of claim 40 wherein the halogenating agent is bromine in a mixture of carbon tetrachloride and phosphorous tribromide.

42. $\Delta^3$-5$\beta$-taurocholenic acid potassium salt.

No references cited.

ELBERT L. ROBERTS, Primary Examiner

U.S. Cl. X.R.

260—397.1, 397.3